United States Patent
Schulnig et al.

(10) Patent No.: US 10,870,544 B2
(45) Date of Patent: Dec. 22, 2020

(54) HEIGHT-ADJUSTING DEVICE FOR A GRIPPING AND TRANSPORTING MEANS FOR CONTAINERS

(71) Applicant: TYROLON-SCHULNIG GMBH, Hochfilzen (AT)

(72) Inventors: Elmar Schulnig, Fieberbrunn (AT); Ludwig Schulnig, St. Jakob in Haus (AT)

(73) Assignee: Tyrolon-Schulnig GmbH, Hochfilzen (AT)

( * ) Notice: Subject to any disclaimer, the term of this patent is extended or adjusted under 35 U.S.C. 154(b) by 0 days.

(21) Appl. No.: 16/485,164

(22) PCT Filed: Oct. 26, 2017

(86) PCT No.: PCT/EP2017/077404
§ 371 (c)(1),
(2) Date: Aug. 11, 2019

(87) PCT Pub. No.: WO2018/162097
PCT Pub. Date: Sep. 13, 2018

(65) Prior Publication Data
US 2020/0039762 A1 Feb. 6, 2020

(30) Foreign Application Priority Data
Mar. 9, 2017 (DE) .................. 10 2017 105 015

(51) Int. Cl.
B65G 47/86 (2006.01)
B67C 7/00 (2006.01)
F15B 15/14 (2006.01)

(52) U.S. Cl.
CPC .......... *B65G 47/847* (2013.01); *B67C 7/0053* (2013.01); *B65G 2201/0244* (2013.01);
(Continued)

(58) Field of Classification Search
None
See application file for complete search history.

(56) References Cited

U.S. PATENT DOCUMENTS 2,497,813 A    2/1950  Darr
3,381,590 A *  5/1968  Rosenberg .......... F15B 15/1457
                                                        92/140

(Continued)

FOREIGN PATENT DOCUMENTS

DE         597564 C    7/1934
DE       19841792 A1   6/1999
(Continued)

OTHER PUBLICATIONS

ISR PCT/EP2017/077404, dated Jan. 22, 2018, 14 pages.
DE Office Action corresponding to DE 10 2017 105 015.9, dated Oct. 18, 2017.

*Primary Examiner* — William R Harp
(74) *Attorney, Agent, or Firm* — Brooks Kushman P.C.

(57) ABSTRACT

A height-adjusting device for a gripping and transporting mechanism for containers having a lifting cylinder comprises a cylinder base, a cylinder tube, a piston arranged sealingly slidable in the cylinder tube, a cylinder cover, and at least one first piston rod connected to the piston. The first piston rod is guided out of the cylinder tube through the cylinder cover in a sealing sliding manner by its end opposite from the piston, is arranged in the cylinder tube, and has at least one first and/or second fluid path. The first fluid path is pressurized by a pressurized fluid at the end of the first piston rod opposite from the piston, the first piston rod passes through the piston and communicates with a first cylinder interior at the cylinder base-side of the piston and/or the second fluid path communicates with a second cylinder interior at the cylinder cover-side of the piston.

17 Claims, 5 Drawing Sheets

(52) U.S. Cl.
CPC ......... *F15B 15/149* (2013.01); *F15B 15/1466* (2013.01); *F15B 2211/7053* (2013.01)

(56) References Cited

U.S. PATENT DOCUMENTS

| | | | | |
|---|---|---|---|---|
| 3,399,786 | A * | 9/1968 | Honeycutt | B66C 13/18 212/261 |
| 3,957,154 | A * | 5/1976 | Shiba | B07C 5/122 198/394 |
| 4,144,980 | A * | 3/1979 | Meyer | E02F 3/407 414/725 |
| 7,007,793 | B2 * | 3/2006 | Stocchi | B65G 29/00 198/473.1 |
| 7,322,273 | B2 * | 1/2008 | Rafn | F15B 15/1447 411/303 |
| 8,002,107 | B2 * | 8/2011 | Balzarin | B65G 29/00 198/470.1 |
| 9,181,043 | B1 | 11/2015 | Goudy et al. | |
| 9,499,353 | B2 * | 11/2016 | Fahldieck | B65G 47/846 |
| 9,581,242 | B2 * | 2/2017 | Kobayashi | F16J 10/02 |
| 2011/0114454 | A1 | 5/2011 | Balzarin et al. | |

FOREIGN PATENT DOCUMENTS

| | | |
|---|---|---|
| DE | 19903319 A1 | 8/1999 |
| DE | 102015114567 A1 | 3/2017 |
| EP | 2186759 A1 | 5/2010 |
| JP | S5311282 A | 2/1978 |
| JP | 2010168047 A | 8/2010 |
| WO | 02058615 A2 | 8/2002 |
| WO | 2017009291 A1 | 1/2017 |

\* cited by examiner

HEIGHT-ADJUSTING DEVICE FOR A GRIPPING AND TRANSPORTING MEANS FOR CONTAINERS

CROSS-REFERENCE TO RELATED APPLICATION

This application is the U.S. national phase of PCT Application No. PCT/EP2017/077404 filed on Oct. 26, 2017, which claims priority to DE Patent Application No. 10 2017 105 015.9 filed on Mar. 9, 2017, the disclosures of which are incorporated in their entirety by reference herein.

TECHNICAL FIELD

The disclosure relates to a height-adjusting device for a gripping and transporting mechanism for containers. The disclosure further relates to a gripping and transporting mechanism for gripping, holding, guiding and transporting particularly bottle-like containers having a height-adjusting device.

BACKGROUND

Gripping and transporting mechanisms for gripping, holding and/or guiding containers are already known from the prior art, in particular being known as "clamping stars." They are primarily used in the production line processing of containers or receptacles particularly intended to be filled with liquids or other bulk material.

The bulk processing of such containers/receptacles necessitates regularly adapting the gripping and transporting mechanisms to the respectively different types of containers. Such container types can substantially differ from one another in their general shape, in particular their height, width and/or diameter.

Production line processing of high volumes of containers likewise makes the calibrating of gripping and transporting mechanisms absolutely imperative in order to be able to ensure safe handling by the gripping and transporting mechanism and prevent wastage in terms of deficient filling, incorrect labeling or damaged containers.

Hygienic aspects within assembly line-type production lines are furthermore also to be considered, in particular when filling or respectively processing foodstuffs or the like.

Known systems have the disadvantage of a height adjustment needed to adapt to different types of containers to be processed necessitating extensive machine retooling. Complete machine shutdown needs to be indulged during the retooling process. As a result, adapting to different types of containers is time-consuming and costly.

SUMMARY

The disclosure is based on the task of providing an advantageous height-adjusting device as well as a gripping and transporting mechanism for gripping, holding, guiding and transporting containers, wherein simple, fast and economical height adjustment can be provided in conjunction with simplified maintenance and retooling.

This task is solved by height adjustment as well as a gripping and transporting mechanism disclosed herein. Further advantageous developments of the inventive subject matter are disclosed herein.

The inventive height-adjusting device for a gripping and transporting mechanism for containers is provided with a lifting cylinder having a cylinder base, a cylinder tube, a piston arranged sealingly slidable in the cylinder tube, a cylinder cover and at least one first piston rod connected to the piston. The first piston rod is guided out of the cylinder tube through the cylinder cover in a sealing sliding manner by its end opposite the piston.

The first piston rod is arranged in the cylinder tube, whereby the first piston rod has at least one first and/or second fluid path which can be pressurized by a pressurized fluid at the end of the first piston rod opposite from the piston.

The first fluid path passes through the piston and communicates with a first cylinder interior at the cylinder base-side of the piston. The second fluid path can communicate with a second cylinder interior at the cylinder cover-side of the piston.

The first and second fluid path or fluid line respectively can in particular be configured in the form of a piston rod bore over the entire length or part of the length of the piston rod. It is thus possible for a single fluid path to be configured as a longitudinal bore over at least part of the piston rod's full length and a complete fluid flow path to be configured within the piston rod by means of a second bore provided transverse to the piston rod's longitudinal axis.

While the usual fluid pressurization ensues at an end of the piston rod opposite the piston, the fluid outlet can be provided at the oppositely disposed end of the piston rod or at the side of the piston rod. To be taken into account in terms of effective use is that fluid can always flow or respectively enter and exit in both directions along the fluid path.

The term "container" is in particular containers and/or receptacles for receiving or respectively transporting liquids or other bulk material. Various types of containers can differ in, among other things, their shape, their maximum filling capacity and their material such as glass, plastic or metal.

The lifting cylinder in the context of the inventive subject matter is preferably provided as a double-acting fluid cylinder or pneumatic cylinder respectively. A targeted positioning of the piston within the lifting cylinder can thereby be made in order to provide specific, reliable height adjustment for the gripping and transporting mechanism.

Alternatively, the lifting cylinder can be provided as a single-acting cylinder having a return spring or the like.

The piston rod is moreover guided out of the cylinder tube through the cylinder cover in a sealing sliding manner by its end opposite the piston. Provided in this context is one end of the piston rod being arranged in the cylinder tube, wherein the oppositely disposed end of the piston rod, or the end of the piston rod opposite the piston respectively, is positioned external of the cylinder tube.

So that part of the at least one piston rod can be arranged in the cylinder tube, it is guided through the cylinder cover or a corresponding opening of the cylinder cover respectively. The opening of the cylinder cover is provided such that the piston rod is accommodated in a sealing sliding manner.

Sealing sliding means that the corresponding opening provides a radial or circumferential seal for the piston rod. Furthermore, the piston rod is, in the context of the lifting cylinder movement, movably supported longitudinally within the corresponding opening of the cylinder cover. In this way, the interior volume of the cylinder tube is sealed in a fluid-tight manner from the environment or atmosphere and at the same time is protected against contamination by dust or grime.

The piston rod further comprises at least one first and/or second fluid path which can be pressurized by a pressurized fluid at the end of the first piston rod opposite from the piston. Preferably, the fluid path or fluid line respectively is formed within the piston rod. In particular, the fluid path can be provided as a bore in a sealed groove or the like in the piston rod so that fluid or respectively compressed air can be transferred or respectively conveyed in the longitudinal direction of the piston rod.

The first and/or second fluid path or fluid line respectively is configured at the end of the piston rod opposite from the piston such that a fluid or respectively compressed air can be supplied. The far end of the piston rod is thus to be construed as a fluid inlet or fluid entry respectively. The piston rod thus constitutes both a mechanical component as well as a pneumatic component of the inventive lifting cylinder.

Moreover provided is for the first fluid path to pass through the piston and communicate with a first cylinder interior provided at the cylinder base-side of the piston. The second fluid path can communicate with a second cylinder interior provided at the cylinder cover-side of the piston.

Communication or communicating means that a fluid or compressed air respectively is communicable. A flow-configured connection is thus provided along the respective flow path. The fluid path or fluid line respectively can thereby be formed by a plurality of collectively interconnected components.

The cylinder base-side first cylinder interior can in particular be provided as a fluid-fillable volume for extending the lifting cylinder. In this case, the first fluid path or first fluid line respectively projects through the piston along the longitudinal extension of the piston rod so as to be able to conduct the provided fluid or provided compressed air respectively into the first cylinder interior.

The cylinder cover-side second cylinder interior can in particular be provided as a fluid-fillable volume for contracting or respectively shortening the lifting cylinder.

The first cylinder interior can also be understood as a lower cylinder interior, whereby the second cylinder interior can be construed as being an upper cylinder interior.

In the general sense of the present disclosure, a first component can be provided as a lower component and the second component as an upper component, particularly when the lifting cylinder is vertically aligned with the longitudinal or respectively symmetrical axis. This does not apply, however, to the at least one first piston rod, wherein two piston rods are preferably aligned parallel to each other.

A double-acting or single-acting lifting cylinder can thus be advantageously provided, whereby at least a first or a second fluid path is integrally formed in the at least one first piston rod.

According to one embodiment, the lifting cylinder comprises a second piston rod connected to the piston, wherein the second piston rod is guided out of the cylinder tube by its end opposite the piston in a sealing sliding manner and the two piston rods are arranged eccentrically in the piston.

According to a further embodiment, the first piston rod and the second piston rod are arranged symmetrically to the lifting cylinder's symmetrical axis. In so doing, symmetrical guidance ensues when the lifting cylinder is moved along the piston rods guided through the cylinder cover.

It can thereby be provided for the first fluid path to pass through the piston and communicate with a first cylinder interior at the cylinder base-side of the piston and the second fluid path to communicate with a second cylinder interior at the cylinder cover-side of the piston.

Preferably provided is for the first piston rod to comprise the first fluid path or first fluid line respectively to the first cylinder interior, whereby the second piston rod forms the second fluid path to the second cylinder interior.

It may alternatively be provided for the first and second piston rod to be provided as concentrically arranged piston rods, wherein the first piston rod can preferably be provided as the outer or inner piston rod and the second piston rod as the inner or outer piston rod. The respective inner piston rod is in this sense accommodated in the outer piston rod.

Provided according to one embodiment is for the first piston rod to comprise the first and second fluid path, whereby the first and second fluid path can be pressurized by a pressurized fluid at the opposite end of the first piston rod from the piston and the first fluid path passes through the piston and communicates with a first cylinder interior at the cylinder base-side of the piston, wherein the second fluid path communicates with a second cylinder interior at the cylinder cover-side of the piston.

The first piston rod can thus be provided as the only piston rod. The second piston rod is dispensed with. In particular, the first piston rod comprises two bores running parallel to each other in the longitudinal direction as the first and second fluid path.

The first fluid path preferably extends over the entire length of the first piston rod. The second fluid path preferably extends over part of the first piston rod's longitudinal length and is completed in conjunction with a second bore transverse to the longitudinal direction of the first piston rod. Thus, a first and a second cylinder interior can be expediently and as needed aerated or deaerated with compressed air on both sides of the piston via the first and second fluid path.

The fluid path, or the first and second fluid path respectively, can be formed by more than just a piston rod alone. In fact, further components of the lifting cylinder, e.g. the piston as well as for example standard hose clips, hollow screws or the like, can aid in the forming or advancing of the individual flow path in the context of the height-adjusting device.

A flow path is thus essentially to be understood as a volume along which a fluid such as a gas or a liquid can be conducted to its destination in the sense of intended utility.

According to a further embodiment, a cylinder liner arranged coaxially with the symmetrical axis of the lifting cylinder and having a liner base is provided on the opposite end of the piston rod from the piston, wherein the cylinder liner is open toward the cylinder base of the cylinder tube and arranged on the outer lateral surface of the cylinder tube so as to displaceably slide in the axial direction of the lifting cylinder, whereby the fluid paths of the piston rod are at least partly accommodated in the liner base of the cylinder liner and can be accessed from the outside for the pressurizing with pressurized fluid.

The cylinder liner is substantially closed on one side by the liner base. However, different kinds of bores can thereby be provided for example in the liner base. The opposite side of the cylinder liner is of open configuration over its inner diameter.

The cylinder liner can thus be at least partially pulled over the cylinder tube in the direction of the symmetrical or longitudinal axis respectively. The sealingly slidable arrangement of the cylinder liner on the outer lateral surface of the cylinder tube offers in particular the advantage of ensuring a controlled relative motion between the cylinder tube and cylinder liner and being able to prevent dirt from infiltrating in terms of hygienic requirements.

The first and second fluid path or the at least one first piston rod respectively is at least partly accommodated in the liner base of the cylinder liner and accessible from the outside for pressurizing with pressurized fluid.

In this sense, the at least one first piston rod is non-positively and/or positively connected to the liner base, preferably screwed into the liner base via a thread. The same can apply to the second piston rod where applicable.

In the sense of the configuration of the first and second fluid path, the liner base represents a continuance to the fluid paths, preferably by means of corresponding bores.

The seatings for the piston rods are in particular configured such that the piston rods are accommodated in the liner base and the first/second fluid path able to be pressurized with pressurized fluid from the outside.

A pressurized fluid can be a suitable gas such as air or nitrogen or the like or, respectively, a fluid such as e.g. hydraulic oil or the like. Preferably provided in the sense of a gripping and transporting mechanism for the further processing of containers is for the inventive height-adjusting device to be operated with compressed air. In this respect, connections between individual pneumatic or hydraulic components are expediently configured to be airtight/liquid-tight.

According to a further embodiment, a tapped hole is inset into the liner base of the cylinder liner for screwing in a threaded rod so that the cylinder liner's vertical lift relative to the cylinder cover can be limited.

The threaded rod can in this sense serve as a limit stop to limit vertical travel of the height-adjusting device. The threaded rod is preferably non-positively and/or positively accommodated in the liner base of the cylinder liner, in particular in the form of a screwed fitting.

The at least one tapped hole can be provided coaxially with the longitudinal axis of the cylinder tube or cylinder liner respectively. Alternatively, a plurality of seats or respectively tapped holes for a plurality of threaded rods can be radially distributed around the longitudinal axis of the cylinder tube or cylinder liner respectively.

A correspondent aspect of the present disclosure relates to a gripping and transporting mechanism for gripping, holding, guiding and transporting in particular bottle-like containers. The gripping and transporting mechanism is provided with an inventive height-adjusting device having a first support ring and a second support ring, both rotatable about the symmetrical axis of the lifting cylinder in parallel alignment, at least one gripping mechanism which comprises at least one first gripper arm pair, at least one second gripper arm pair and a control cam for opening or closing the gripper arm pairs, wherein the first gripper arm pair is pivotably secured to or on the first support ring and the second gripper arm pair is pivotably secured to or on the second support ring, and wherein the gripper arm pairs can be moved from a gripping position into an open position or vice versa by means of the control cam. A cylindrical supporting sleeve open on one side and having a sleeve base is furthermore provided which is rotationally secured to the liner base of the coaxial cylinder liner, wherein the second support ring is secured to the open end face of the supporting sleeve.

The first support ring of the gripping and transporting mechanism is provided for accommodating the first gripper arm pair. The second support ring is provided for accommodating the second gripper arm pair. In that the distance between the first and second support ring is adjustable, different types of containers can be handled or respectively processed by the inventive gripping and transporting mechanism.

The first support ring can in particular be understood as the lower support ring, whereby the second support ring can be an upper support ring. The same also applies for example to the first and second pair of gripper arms. This particularly applies when the gripping and transporting mechanism is vertically aligned along its rotational axis.

In the course of the production line processing of containers, the control cam serves in providing an automatic closing and opening movement of the first gripper arm pair and second gripper arm pair. By doing so, a container can be grasped or respectively picked up by means of the first and second gripper arm pairs during a closing movement of the gripper arm pairs as well as released again during the opening movement of the gripper arm pairs.

The supporting sleeve is furthermore connected to the cylinder liner of the lifting cylinder in rotationally secure manner. The supporting sleeve can in particular be non-positively and/or positively clamped to the cylinder liner.

Moreover, the second support ring is secured to the open end face of the supporting sleeve. The second support ring is thus positionable relative to the first support ring by means of the supporting sleeve.

The supporting sleeve with the second support ring also being connectable to the cylinder liner of the lifting cylinder in rotationally secure manner allows a fine adjustment of the second support ring relative to the first support ring.

This type of precision adjustment is necessary in order to achieve alignment of the first and second gripper arm pairs between the first and second support ring. Bores in the first and second support ring can be aligned with each other by the supporting sleeve with the second support ring being aligned with and connected to the cylinder liner in rotationally secure manner. Corresponding bolts can be inserted into said bores as alignment and/or spacing means. An interlocking thus occurs between the first and second support ring; the proper alignment of the first and second pair of gripper arms with each other is ensured.

Provided the first and second support ring are aligned with each other, the bolts can be led through the bores of the second support ring and screwed into tapped holes of the first support ring. It is alternatively also conceivable for the first and second support ring to have simple locating bores without threads so that the at least one bolt can be inserted.

According to a further embodiment, fixing means are provided on the outer side of the liner base of the cylinder liner which, starting from the liner base of the cylinder liner, extend in the direction of the symmetrical axis. The sleeve base of the supporting sleeve has elongated holes for receiving the fixing means.

An interlocking, in particular a rotational locking, can thus be provided between the supporting sleeve and the cylinder liner by means of the fixing means preferably configured as a threaded rod. The fixing means can be screwed for example into the liner base of the cylinder liner and extend into or respectively through the elongated holes of the sleeve base of the supporting sleeve. The threaded rod can thus be screwed to the sleeve base by means of e.g. a nut or the like, wherein the supporting sleeve is braced relative to the cylinder liner. The elongated holes of the sleeve base preferably allow a fine rotational adjustment of the supporting sleeve relative to the cylinder liner. The first and second support ring with the first and second pair of gripper arms can thus in particular be aligned with each other.

It can moreover be provided for the second support ring to comprise a concentric inner ring. The cylindrical supporting sleeve has an external thread on its open end face and the inner ring of the second support ring a corresponding internal thread, whereby the second support ring can be secured to the cylindrical supporting sleeve. The second support ring can thus be positioned or respectively aligned in relation to the first support ring by means of the supporting sleeve.

In a further embodiment, the first support ring likewise comprises a concentric inner ring, whereby the first support ring can be secured to the cylinder tube or to the cylinder base of the lifting cylinder by means of the concentric inner ring. The first and second support ring are positionable relative to each other via the lifting cylinder and the supporting sleeve.

According to a further embodiment, the cylinder tube or the cylinder base of the lifting cylinder has an external flange to which the first support ring can be secured by means of its concentric inner ring, particularly by means of screws.

The external flange of the lifting cylinder at the cylinder tube or the cylinder base is preferably radially circumferential. This thus provides a secure connection with a plurality of screws as well as uniform connection stability along the circumference of the first support ring. Tilting of the first support ring can be prevented.

Thus, able to be provided is an advantageous non-positive and/or positive connection for securing the first support ring to the lifting cylinder, same also being easy to reach for maintenance purposes.

It can furthermore be provided for the concentric inner ring of the first support ring to be connected to the first support ring and/or the concentric inner ring of the second support ring to the second support ring by radial struts.

In particular, the first and/or second support ring in this sense constitute(s) a frame by means of bracing between the inner and outer ring. This thereby enables achieving a stable and at the same time lightweight configuration of the first and/or second support ring.

The first and/or second support ring can also be alternatively provided as a support plate or a partially cut support plate, etc.

The following will reference the accompanying schematic drawings in describing the disclosure in greater detail on the basis of exemplary embodiments. Further embodiments of the inventive subject matter are thereby not to be excluded.

BRIEF DESCRIPTION OF THE DRAWINGS

Shown schematically are.

DETAILED DESCRIPTION

Figures 1A, 1B:
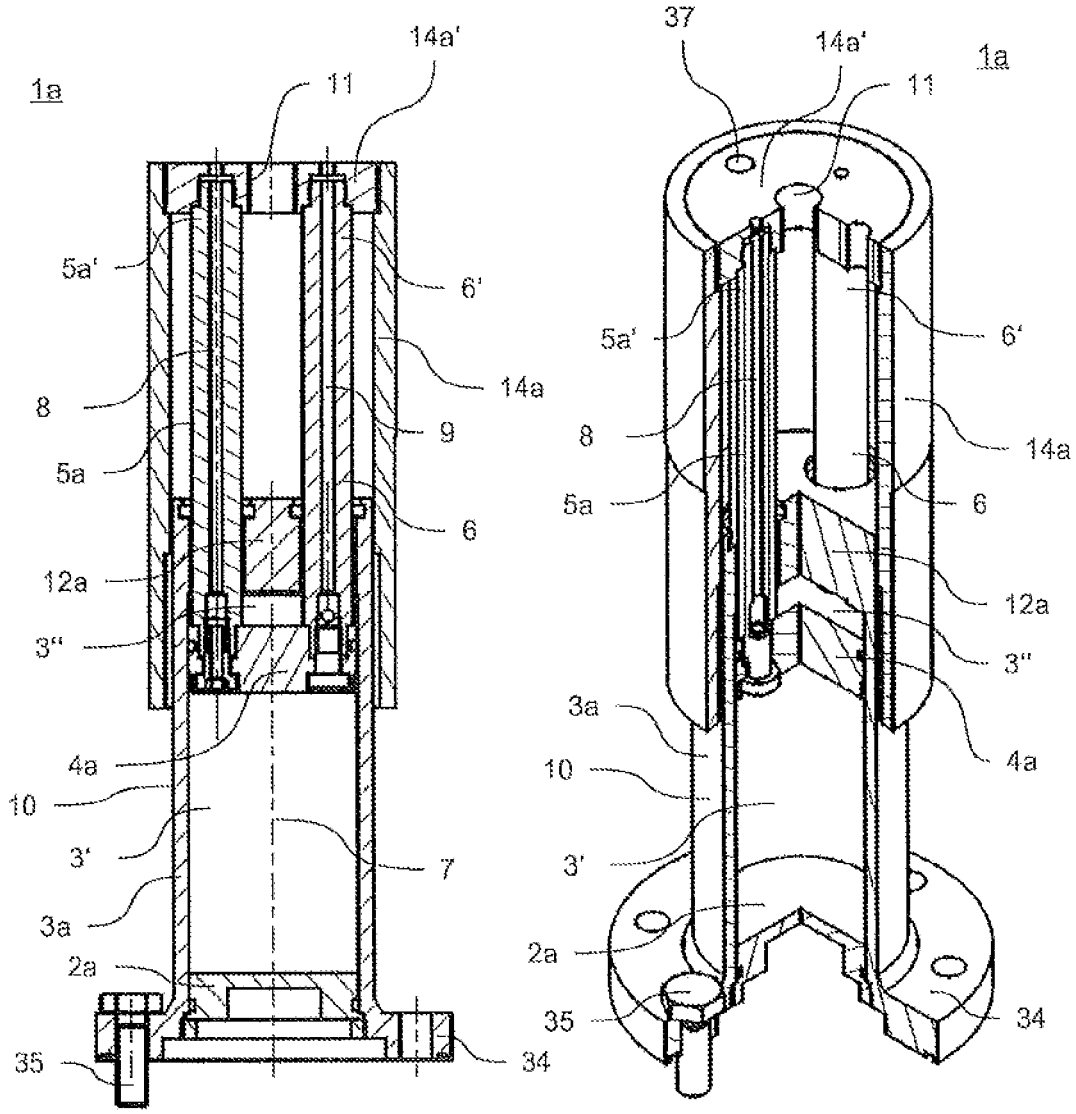
FIG. 1a, 1b: a first exemplary embodiment of a lifting cylinder for a height-adjusting device in a sectional view and a perspective view.

FIGS. 1a and 1b show a first exemplary embodiment of a lifting cylinder 1a for a height-adjusting device.

The lifting cylinder 1a is formed with a cylinder tube 3a having a circumferential flange 34. The flange 34 is provided with bores so that a first support ring 20 (not shown in FIG. 1a, 1b) can be secured to the cylinder tube 3a of the lifting cylinder 1a by means of screws 35.

The lifting cylinder 1a is provided with a cylinder base 2a in the cylinder tube 3a. The cylinder base 2a can be screwed into the cylinder tube 3a by a combination of internal thread in the cylinder tube 3a and external thread on the cylinder base 2a. The cylinder base 2a limits the internal volume of the cylinder tube 3a on one side.

A piston 4a is further arranged in the cylinder tube which is accommodated in the cylinder tube 3a in sealing sliding manner. The piston 4a is in particular configured so as to be able to glide within the cylinder tube 3a along a longitudinal axis or symmetrical axis 7, of the cylinder tube 3a. At the same time, the piston 4a divides the cylinder tube 3a into a first cylinder interior volume 3' and a second cylinder interior volume 3". The piston 4a thus forms a fluid-tight or airtight contact with the cylinder tube 3a along its circumference.

A cylinder cover 12a is furthermore provided on the cylinder tube 3a. The cylinder cover can be integrally formed with the cylinder tube 3a or screwed into the cylinder tube 3a. The cylinder cover 12a in particular limits the volume of the cylinder tube 3a at the side opposite from the cylinder base 2a.

Together with the piston 4a, the cylinder base 2a limits the first cylinder interior volume 3', wherein the cylinder cover 12a with the piston 4a limits the second cylinder interior volume 3".

A cylinder liner 14a is provided on an exterior surface 10 of the cylinder tube 3a. The cylinder liner 14a is configured so as to be able to slide along the exterior surface 10 of the cylinder tube 3a in the longitudinal direction of a symmetrical axis 7. Relative motion between the cylinder liner 14a and cylinder tube 3a is thus possible.

The cylinder liner 14a has a liner base 14a' at one end, whereby the opposite end of the cylinder liner is of open configuration. This allows the cylinder tube 3a to slide into the cylinder liner 14a via the open side.

The liner base 14a' is shown in FIG. 1a, 1b with a central coaxial tapped hole 11 for receiving a threaded rod (not shown in FIG. 1a, 1b). The threaded rod can in particular be understood as a limit stop for the cylinder tube 3a with cylinder cover 12a so that vertical travel of the lifting cylinder 1a can be limited in any desired manner.

The liner base 14a' furthermore comprises bores or respectively tapped holes 37 for receiving fixing means which can extend from the exterior of the liner base 14a' toward the symmetrical axis 7.

The lifting cylinder 1a according to FIGS. 1a and 1b is moreover provided with a first piston rod 5a and a second piston rod 6. The two piston rods 5a, 6 are arranged symmetrically to the symmetrical axis 7.

Both piston rods 5a, 6 are received and screwed into the liner base 14a' at a respective far end 5a', 6' from the piston. The liner base 14a' comprises locating bores with internal threads thereto so that the first and second piston rod 5a, 6 can in each case be screwed into the liner base 14a' via an external thread.

The first and second piston rod 5a, 6 partly project into the liner base 14a'. Alternatively, the first and second piston rod 5a, 6 can protrude though the liner base 14a'.

The piston rods 5a, 6 are furthermore received in the cylinder cover 12a and the piston 4a. The piston rods 5a, 6 in particular protrude though the cylinder cover 12a. The cylinder cover 12a with its corresponding locating bores and the piston rods 5a, 6 can insofar be regarded as a guidance pairing.

The first and second piston rod 5a, 6 project into the piston 4a. In particular, the piston 4a according to FIG. 1a, 1b is screwed to the first and second piston rods 5a, 6 by a screw or respectively set screw or the like. The screws each protrude into the piston rods 5a, 6 and thus interlock the piston 4a with the piston rods 5a, 6.

The first piston rod 5a forms a first fluid path 8. The second piston rod 6 forms a second fluid path 9. The first and second fluid path 8, 9 are in particular configured as bores in the piston rods 5a, 6.

The first fluid path 8 establishes a fluid connection to the first cylinder interior volume 3'. The second fluid path 9 establishes a fluid connection to the second cylinder interior volume 3". The lifting cylinder 1a is in this sense a double-acting lifting cylinder.

The second fluid path 9 in the second piston rod 6 is thus configured as a longitudinal bore over part of the length of the second piston rod 6, whereby a connection to the second cylinder interior volume 3" is realized via a second bore transverse to the longitudinal or respectively symmetrical axis 7.

The first fluid path 8 can in contrast be provided as a longitudinal bore over the entire length of the first piston rod 5a so that a fluid connection to the first cylinder interior volume 3' can be established through the piston 4a.

By the first and second piston rod 5a, 6 being connected to the liner base 14a' or partly projecting into the latter, the first and second fluid path 8, 9 is partly formed by the locating bores of the liner base 14a'. The accommodating of the piston rods 5a, 6 in the liner base 14a' is thereby provided such that the first and second fluid path 8, 9 can be pressurized by pressurized fluid/compressed air from the outside.

On the basis of the first exemplary embodiment of a lifting cylinder 1a, an integral configuration to the fluid paths 8, 9 is thus possible according to FIG. 1a, 1b for, in particular, providing a double-acting lifting cylinder.

Figures 2A, 2B:
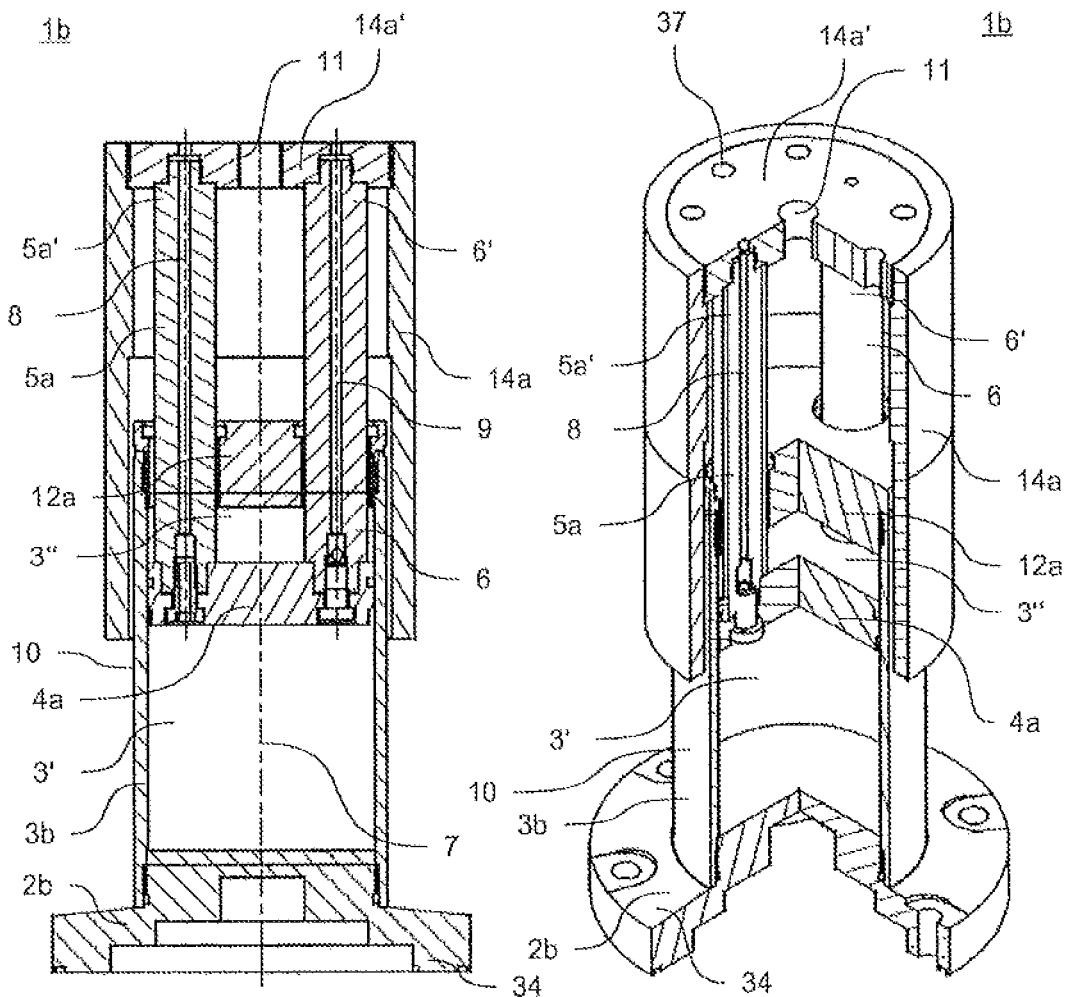
FIG. 2a, 2b: a second exemplary embodiment of a lifting cylinder for a height-adjusting device in a sectional and a perspective view.

A second exemplary embodiment of a lifting cylinder 1b for a height-adjusting device is depicted in FIG. 2a, 2b in a sectional and a perspective view.

This second exemplary embodiment of the lifting cylinder 1b differs from the first exemplary embodiment according to FIG. 1a, 1b particularly in the configuration of the cylinder tube 3b with the cylinder base 2b.

The cylinder base 2b is accommodated at one end of the cylinder tube 3b, in particular screwed into an internal thread of the cylinder tube 3b. The circumferential flange 34 is however configured to connect to a first support ring 20 through the cylinder base 2b as per FIG. 2a, 2b. The cylinder tube 3b in this sense rests on the cylinder base 2b or respectively the flange 34 of the cylinder base 2b.

Figure 3A:
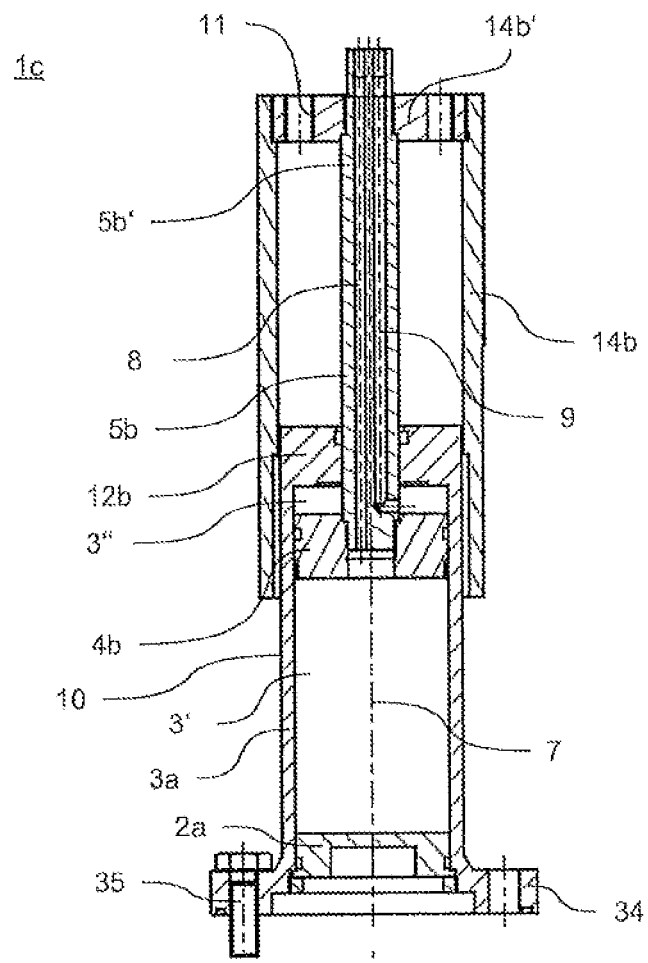
FIG. 3a, 3b: a third exemplary embodiment of a lifting cylinder for a height-adjusting device in a sectional view and a top view.
Figure 3B:
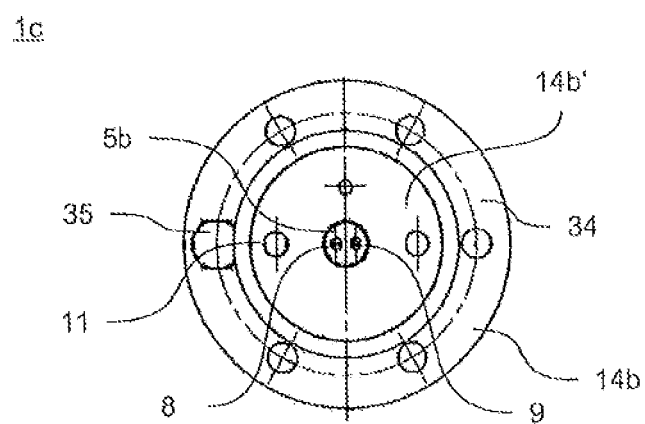

A third exemplary embodiment of a lifting cylinder 1c for a height-adjusting device is depicted in FIG. 3a, 3b in a sectional view and a top view.

This third exemplary embodiment of the lifting cylinder 1c differs from the first exemplary embodiment according to FIG. 1a, 1b particularly in the configuration of the piston rod 5b in conjunction with the piston 4b, the cylinder cover 12b and the liner base 14b' of the cylinder liner 14b.

According to FIG. 3a, 3b, the lifting cylinder 1c is configured with a single first piston rod 5b arranged coaxially with symmetrical axis 7. The piston rod 5b has the first fluid path 8 and second fluid path 9.

The piston rod 5b is received in the piston 4b such that the piston rod 5b at least partially penetrates into the piston 4b. The piston rod 5b thus does not protrude through the piston 4b. But the locating bore of the piston 4b for the piston rod 5b is configured such that the first fluid path 8 is configured in connection with the piston 4b such that there is a fluid connection to the first cylinder interior volume 3'.

Whereas the first fluid path 8 in the piston rod 5b is configured as a longitudinal bore in the direction of the symmetrical axis 7, the second fluid path 9 is in turn formed by a longitudinal bore and a cross hole, in particular transverse to the symmetrical axis 7. The second fluid path 9 can thus establish a fluid connection to the second cylinder interior volume 3".

Just as in FIG. 3b, it is evident from FIG. 3a that the first and second fluid path 8, 9 are symmetrically provided in the first piston rod 5b.

Furthermore, the cylinder cover 12b also has a corresponding locating bore for the single first piston rod 5b with the first and second fluid path 8, 9.

The liner base 14b' of the cylinder liner 14b is likewise of corresponding configuration to the single piston rod 5b. According to FIG. 3a, the piston rod 5b projects through the liner base 14b' and is in this way accessible from the outside for subjecting the first and second fluid path 8, 9 to pressurized fluid.

Moreover, the liner base 14b' comprises at least one bore or tapped hole 11 for receiving a threaded rod as a limit stop for the cylinder tube 3a or respectively the cylinder cover 12b.

According to the third exemplary embodiment as per FIG. 3a, 3b, a first and second fluid path 8, 9 is thus integrally configurable in the single first piston rod 5b as well as the further associated components of the lifting cylinder 1c.

Figure 4A:
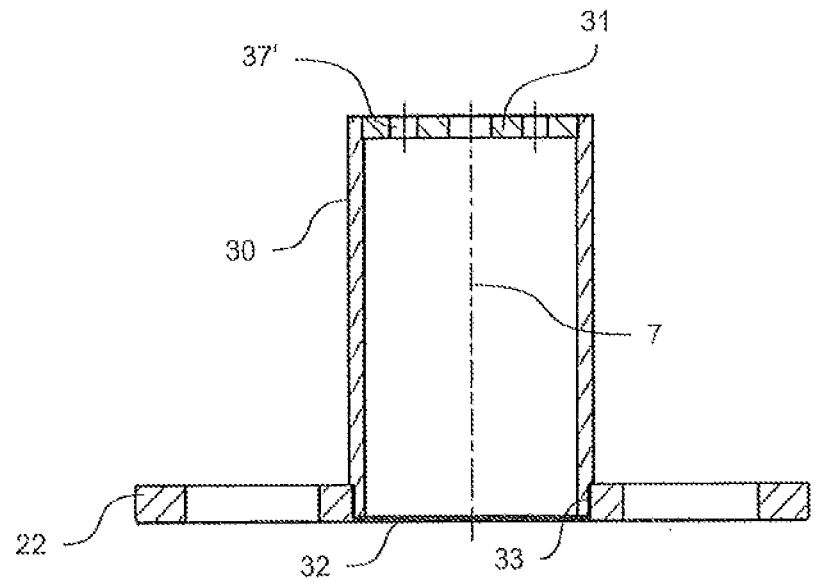
FIG. 4a, 4b: an exemplary embodiment of a supporting sleeve with a first support ring for a gripping and transporting mechanism in a sectional view and a top view.
Figure 4B:
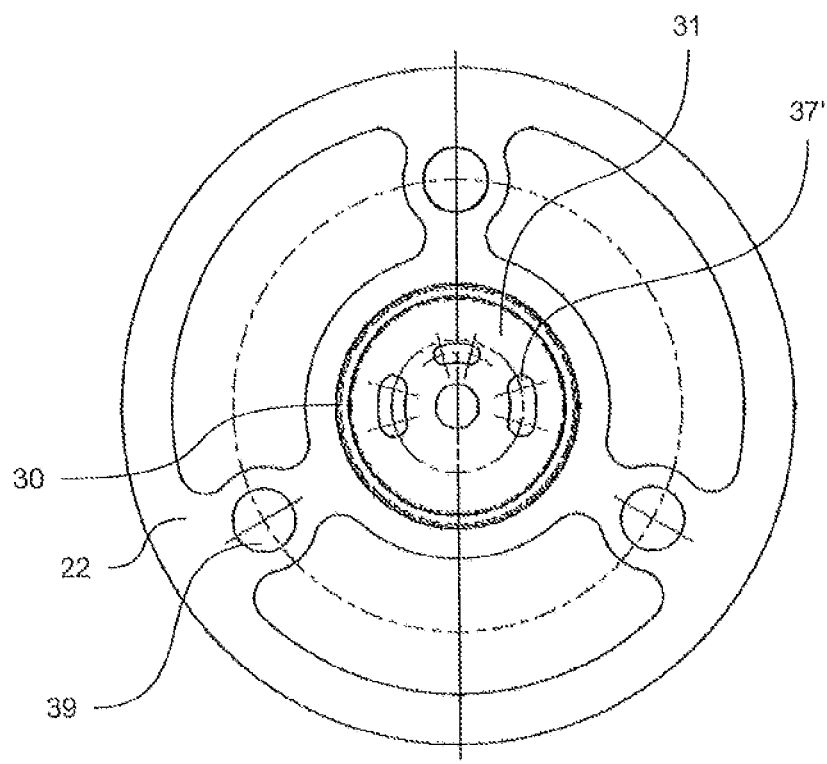

FIG. 4a, 4b illustrates an exemplary embodiment of a supporting sleeve 30 having a second support ring 22 for a gripping and transporting mechanism in a sectional view and in a top view.

The supporting sleeve 30 comprises a sleeve base 31 so that one side of the supporting sleeve 30 is substantially closed. At the side oppositely disposed from the sleeve base 31, the supporting sleeve is provided with an open end face 32. A lifting cylinder 1a, 1b, 1c can thus be inserted into the supporting sleeve 30 via the open end face 32.

The sleeve base 31 comprises elongated holes 37' so that fixing means, which are secured in the locating bores 37 of the liner base 14a', 14b' of the cylinder liner 14a, 14b, can project into or through the elongated holes 37'. According to FIG. 3b, a total of three elongated holes radially arranged around symmetrical axis 7 are provided. The three elongated holes 37' can be of different sizes.

In particular, a threaded rod can be secured in the liner base 14a', 14b' as fixing means so that the threaded rod (not shown in FIG. 4a, 4b) can project through one of the elongated holes 37' and be interlocked with the liner base 31 by means of e.g. a nut. A rotatably secure connection of the supporting sleeve 30 to the cylinder liner 14a, 14b is thus possible. The position of the supporting sleeve 30 along the elongated holes 37 relative to the cylinder liner 14a, 14b can thereby be finely adjusted.

FIG. 4a, 4b furthermore shows the second support ring 22 connected to the supporting sleeve 30. The second support ring 22 has an internal thread and is screwed to the supporting sleeve 30 on an external thread 33 at the open end face 32.

Further recognizable in FIG. 4b is that the second support ring 22 is configured with a total of three locating bores 39, each for one respective bolt 38. By means of such a bolt 38 and the corresponding locating bores 39 in a second support ring 22, an interlocking can be achieved between the first and second support ring 20, 22.

Thus, by means of a fine adjustment along the elongated holes, the interlocking of the supporting sleeve 30 and the cylinder liner 14a, 14b and the interlocking of the first and second support ring 20, 22 provides the possibility of enacting exact relative positioning between the first and second support ring 20, 22 and securing them against each other by means of the bolt 38.

Figure 5A:
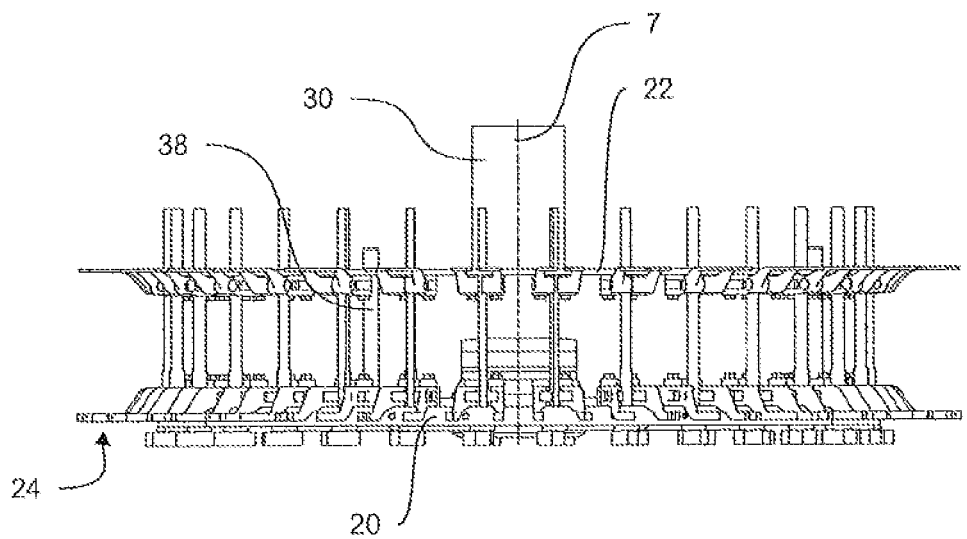
FIG. 5a, 5b: an exemplary embodiment of a gripping and transporting mechanism in a side view and a perspective view.
Figure 5B:
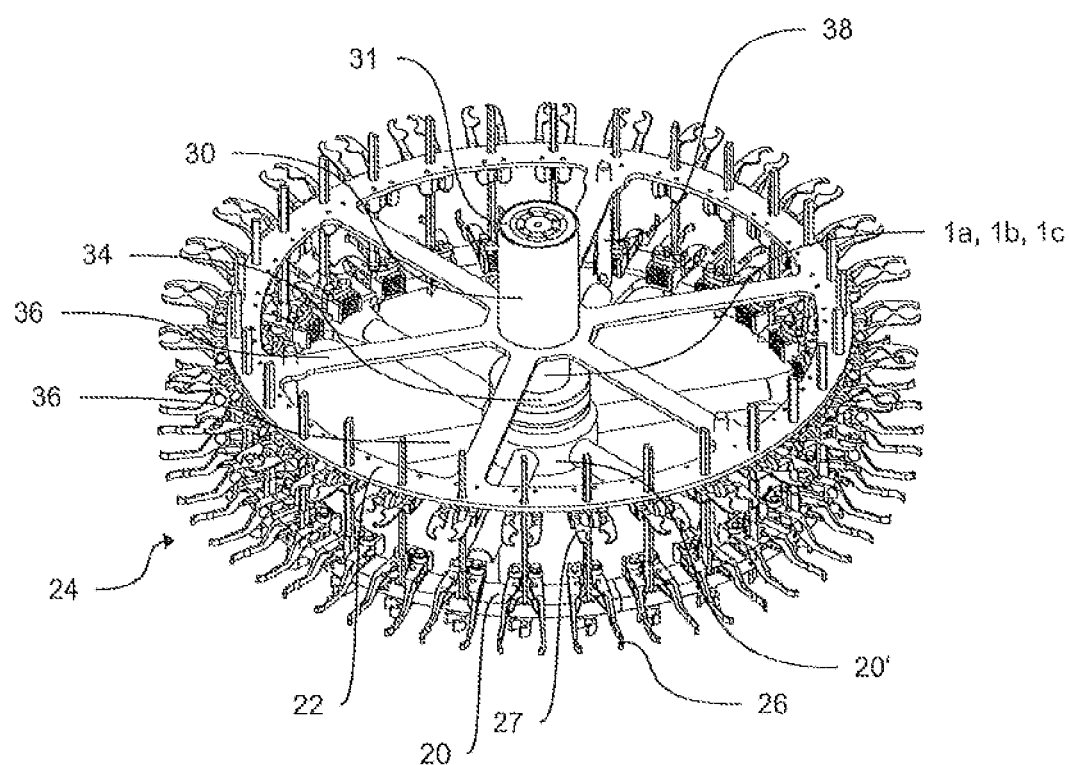

FIG. 5a, 5b depicts one exemplary embodiment of a gripping and transporting mechanism in a side view and a perspective view.

The gripping and transporting mechanism is provided with the first support ring 20 and the second support ring 22. The first support ring 20 is depicted as a lower support ring, whereby the second support ring 22 embodies the upper support ring.

The second support ring 22 is non-positively and/or positively connected to the supporting sleeve 30, in particular screwed to the supporting sleeve 30. The first support ring 20 is connected to the flange 34 of the lifting cylinder 1a, 1b, 1c.

A first and second gripper arm pair 26, 27 is in each case provided along the respective first and second support ring 20, 22 as gripping mechanisms 24. By means of the relative positioning or fine adjustment along the elongated holes 37' between the supporting sleeve 30 and the cylinder liner 14a, 14b, the first and second gripper arm pair 26, 27 can be appropriately aligned with one another.

According to FIG. 5b, the first and second support ring 20, 22 are in each case of frame-like configuration with a concentric inner ring 20', 22' and radial struts 36. Alternatively, the first and second support rings 20, 22 can be of integral configuration.

The bolts 38 in locating bores 39 are provided along the individual struts 36 of the first and second support ring 20, 22 in such a manner that the first and second support ring 20, 22 are non-rotationally interlocked against each other. The bolts 38 can in particular project through the locating bores 39 of the second support ring 22 while the bolts 38 can be screwed into corresponding tapped holes of the first support ring 20. A suitable alignment of the first and second gripper arm pairs 26, 27 relative each other is thus ensured.

In the height-adjusting device as well as the gripping and transporting mechanism, a simple as well as fast and hygienically adaptable device is provided for the processing of different container types such as bottles of differing shape and size.

LIST OF REFERENCE NUMERALS 1a, 1b, 1c lifting cylinder
2a, 2b cylinder base
3a, 3b cylinder tube
3' first cylinder chamber
3" second cylinder chamber
4a, 4b piston
5a, 5b first piston rod
5a', 5b' far end of first piston rod
6 second piston rod
6' far end of second piston rod
7 symmetrical axis of lifting cylinder
8 first fluid line
9 second fluid line
10 outer lateral surface of cylinder tube
12a, 12b cylinder cover
14a, 14b cylinder liner
14a', 14b' liner base
20 first support ring
20' concentric inner ring
22 second support ring
24 gripping mechanism
26 first gripper arm pair
27 second gripper arm pair
30 supporting sleeve
31 sleeve base
32 open end face
33 external thread (of supporting sleeve)
34 outer flange
35 screw
36 radial strut
37 locating bore (for fixing means)
37' elongated hole
38 bolt
39 locating bore (for bolt)

The invention claimed is:

1. A height-adjusting device for a gripping and transporting mechanism for containers having a lifting cylinder comprising a cylinder base, a cylinder tube, a piston arranged sealingly slidable in the cylinder tube, a cylinder cover and at least one first piston rod connected to the piston, wherein the first piston rod is guided out of the cylinder tube through the cylinder cover in a sealing sliding manner by its end opposite the piston,
wherein
the first piston rod is arranged in the cylinder tube and has at least one of a first and/or second fluid path configured to be pressurized by a pressurized fluid at the end of the first piston rod opposite from the piston, the first fluid path passing through the piston and communicating with a first cylinder interior at the cylinder base-side of the piston and/or, the second fluid path communicating with a second cylinder interior at the cylinder cover-side of the piston, and
the device further comprising a cylinder liner, wherein at least one tapped hole is inset into a liner base of the cylinder liner for screwing in a threaded rod so that a vertical lift of the cylinder liner relative to the cylinder cover is limited.

2. The height-adjusting device of claim 1,
wherein
the lifting cylinder comprises a second piston rod connected to the piston, wherein the second piston rod is guided out of the cylinder tube by its end opposite the piston in a sealing sliding manner and the first and second piston rods are arranged eccentrically in the piston.

3. The height-adjusting device of claim 2,
wherein
the first piston rod and the second piston rod are arranged symmetrically to a symmetrical axis of the lifting cylinder.

4. The height-adjusting device of claim 1,
wherein
the first piston rod comprises the first and second fluid paths, wherein the first and second fluid paths are configured to be pressurized by a pressurized fluid at the opposite end of the first piston rod from the piston and the first fluid path passes through the piston and communicates with the first cylinder interior at the cylinder base-side of the piston and the second fluid path communicates with the second cylinder interior at the cylinder cover-side of the piston.

5. The height-adjusting device of claim 1, wherein the cylinder liner is arranged coaxially with a symmetrical axis of the lifting cylinder, the cylinder liner having the liner base on the opposite end of the piston rod from the piston, wherein the cylinder liner is open toward the cylinder base of the cylinder tube and arranged on an outer lateral surface of the cylinder tube so as to be slidably displaceable in the axial direction of the lifting cylinder, wherein the fluid paths of the piston rod are at least partly accommodated in the liner base of the cylinder liner and accessible from the outside for pressurizing with a pressurized fluid.

6. A gripping and transporting mechanism for gripping, holding, guiding and transporting bottle-like containers, the mechanism comprising the height-adjusting device of claim 5 having:

a first support ring and a second support ring, both rotatable about the symmetrical axis of the lifting cylinder in parallel alignment, at least one gripping mechanism comprising at least one first gripper arm pair, at least one second gripper arm pair and a control cam configured to open or close the gripper arm pairs, wherein the first gripper arm pair is pivotably secured to or on the first support ring and the second gripper arm pair is pivotably secured to or on the second support ring, and wherein the gripper arm pairs are movable from a gripping position into an open position or vice versa by control cam, and a cylindrical supporting sleeve open on one side, having a sleeve base which is rotationally secured to the liner base of the coaxial cylinder liner, and wherein the second support ring is secured to the open end face of the supporting sleeve.

7. The gripping and transporting mechanism of claim 6, in which fixing means are provided on the outer side of the liner base of the cylinder liner which, starting from the liner base of the cylinder liner, extend in the direction of the symmetrical axis, wherein the sleeve base of the supporting sleeve comprises elongated holes for receiving the fixing means.

8. The gripping and transporting mechanism of claim 6, in which the second support ring comprises a concentric inner ring, wherein the cylindrical supporting sleeve has an external thread on its open end face and the inner ring of the second support ring has a corresponding internal thread such that the second support ring is configured to be secured to the cylindrical supporting sleeve.

9. The gripping and transporting mechanism of claim 8, in which the first support ring a concentric inner ring, wherein the first support ring is configured to be secured to the cylinder tube or to the cylinder base of the lifting cylinder with the concentric inner ring.

10. The gripping and transporting mechanism of claim 9, wherein the cylinder tube or the cylinder base of the lifting cylinder has an external flange, the first support ring being configured to be secured with its concentric inner ring to the external flange.

11. The gripping and transporting mechanism of claim 8, wherein the concentric inner ring of the first support ring is connected to the first support ring and/or the concentric inner ring of the second support ring is connected to the second support ring by radial struts.

12. A height-adjusting device for a gripping and transporting mechanism for containers having a lifting cylinder comprising:

a cylinder base, a cylinder tube, a piston arranged sealingly slidable in the cylinder tube, a cylinder cover, and at least one first piston rod connected to the piston, wherein the first piston rod is guided out of the cylinder tube through the cylinder cover in a sealing sliding manner by its end opposite the piston, wherein the first piston rod is arranged in the cylinder tube and has at least one of a first and/or second fluid path configured to be pressurized by a pressurized fluid at the end of the first piston rod opposite from the piston, the first fluid path passing through the piston and communicating with a first cylinder interior at the cylinder base-side of the piston and/or, the second fluid path communicating with a second cylinder interior at the cylinder cover-side of the piston, and the device further comprising:

a cylinder liner arranged coaxially with a symmetrical axis of the lifting cylinder and having a liner base on the opposite end of the piston rod from the piston, wherein the cylinder liner is open toward the cylinder base of the cylinder tube and arranged on an outer lateral surface of the cylinder tube so as to be slidably displaceable in an axial direction of the lifting cylinder, wherein the fluid paths of the piston rod are at least partly accommodated in the liner base of the cylinder liner and accessible from the outside for pressurizing with a pressurized fluid, a first support ring and a second support ring, both rotatable about the symmetrical axis of the lifting cylinder in parallel alignment, at least one gripping mechanism comprising at least one first gripper arm pair, at least one second gripper arm pair and a control cam configured to open or close the gripper arm pairs, wherein the first gripper arm pair is pivotably secured to or on the first support ring and the second gripper arm pair is pivotably secured to or on the second support ring, and wherein the gripper arm pairs are movable from a gripping position into an open position or vice versa by the control cam, and a cylindrical supporting sleeve having an open end face and a sleeve base which is rotationally secured to the liner base of the cylinder liner, and wherein the second support ring is secured to the open end face of the supporting sleeve.

13. The device of claim 12, wherein the sleeve base has a plurality of elongated holes configured to receive a fixing means provided on an outer side of the liner base of the cylinder liner, the fixing means extending in a direction of the symmetrical axis from the liner base of the cylinder liner.

14. The device of claim 12, wherein the cylindrical supporting sleeve has an external thread on its open end face and the second support ring has a concentric inner ring including an internal thread corresponding to the cylindrical supporting sleeve's external thread via which the second support ring is securable to the cylindrical supporting sleeve.

15. The device of claim 12, wherein the first support ring is configured to be secured to the cylinder tube or to the cylinder base of the lifting cylinder with a concentric inner ring.

16. The device of claim 12, wherein the cylinder tube or the cylinder base of the lifting cylinder has an external flange configured to secure the first support ring via the first support ring's concentric inner ring.

17. The device of claim 12, further comprising radial struts configured to connect a concentric inner ring to the first support ring and/or to the second support ring.

* * * * *